UNITED STATES PATENT OFFICE.

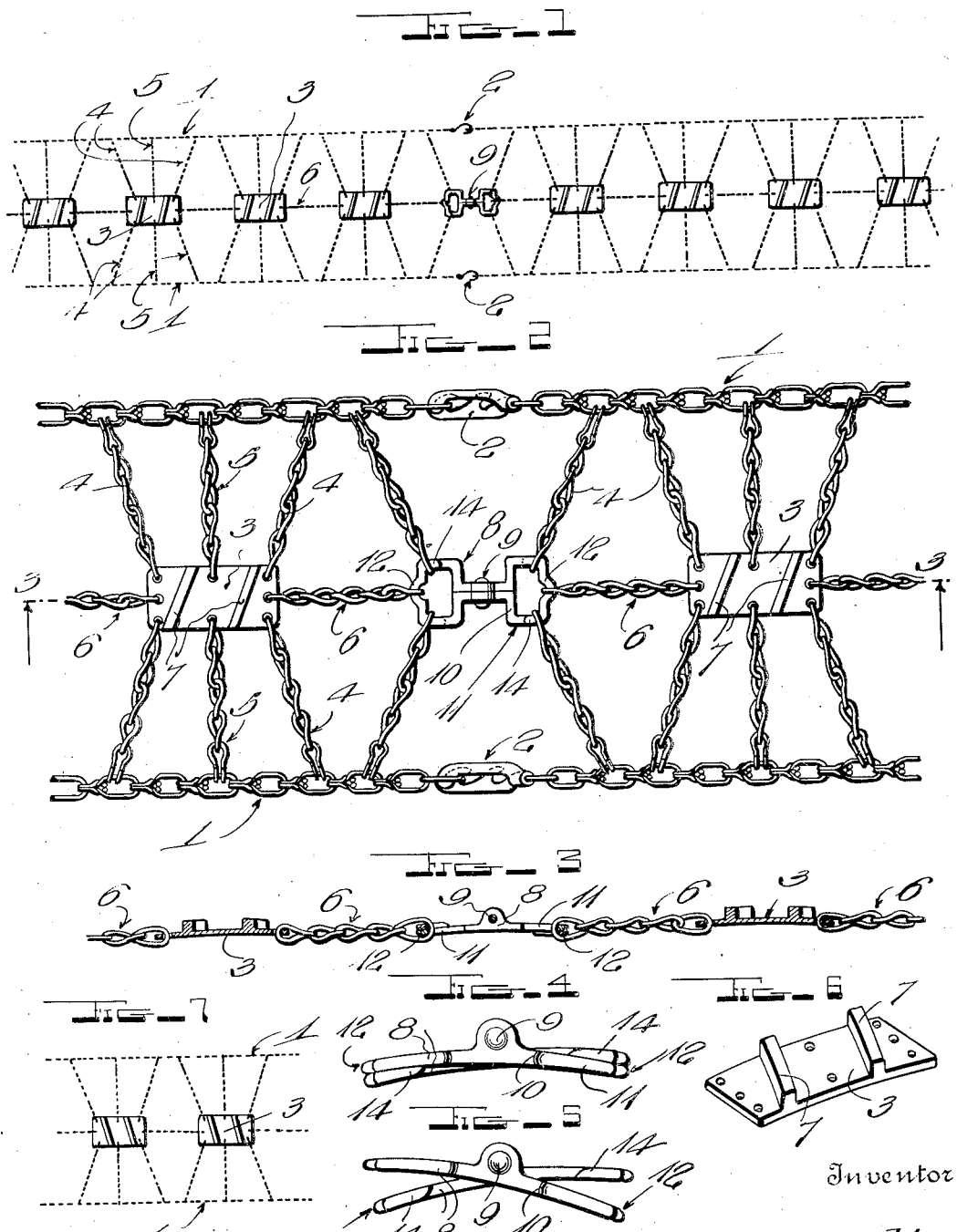

CHARLES S. HAMILTON, OF CUMBERLAND, MARYLAND.

TIRE-CHAIN.

1,389,503.  Specification of Letters Patent.  Patented Aug. 30, 1921.

Application filed March 10, 1921. Serial No. 451,103.

*To all whom it may concern:*

Be it known that I, CHARLES S. HAMILTON, a citizen of the United States, residing at Cumberland, in the county of Allegany and State of Maryland, have invented certain new and useful Improvements in Tire-Chains; and I do declare the following to be a full, clear, and exact description of the invention, such as will enable others skilled in the art to which is appertains to make and use the same.

This invention relates to improvements in tire chains such as are used on automobile wheels for preventing slipping and skidding of the machine, serving also to obtain the desired traction.

The principal object of the invention is to generally improve upon devices of this class by providing one of extreme simplicity and durability which is easy to apply and remove and is such in construction that it very effectively accomplishes the desired results.

Another object of the invention is to provide a tire chain of novel construction, the same embodying split side chains, fasteners for the ends of said chains, and tread chains, those opposite the fasteners having their ends disconnected, and there being a novel fastener for said ends of the tread chains.

A further and important object of the invention is to provide a tire chain which embodies plates having on their outer faces, oblique anti-skid ribs to assist in gaining the proper traction and preventing side skidding. Here, I wish to state that the plates of the chains on one side of the machine have their ribs inclined in the same direction, while the plates of the chains on the opposite side of the machine have their ribs disposed in divergent relation with respect to the ribs on the first named plates, this arrangement insuring the proper traction and preventing as much as possible, side skidding.

A still further object of the invention is to provide a tire chain which embodies the usual side chains, together with a plurality of practically separate closely spaced tread sections made up of short transverse chains connected to anti-skid plates, there being longitudinal chains alined with said plates serving to space the respective chains of said tread sections from one another so as to procure the best possible traction and to overcome skidding.

Other objects and advantages of the invention will be apparent during the course of the following description.

In the accompanying drawings forming a part of this specification and in which like numerals are employed to designate like parts throughout the same:

Figure 1 is a fragmentary diagrammatic top plan view of a tire chain constructed in accordance with this invention, the same embodying skid plates adapted for use on the wheels on one side of the machine.

Fig. 2 is an enlarged fragmentary view of Fig. 1 showing the construction and arrangement of parts more clearly.

Fig. 3 is a central longitudinal sectional view taken on the plane of the line 3—3 of Fig. 2, looking in the direction of the arrows.

Fig. 4 is an edge elevational view of the novel fastener for the ends of the tread chain, the pivoted bars being shown in operative relation.

Fig. 5 is a view like Fig. 4 showing the pivoted bars in spaced relation, which position they assume before the links of the tread chains are being connected thereto.

Fig. 6 is a detail perspective view of one of the skid-plates.

Fig. 7 is a view like Fig. 1 showing a chain embodying skid-plates such as used on wheels on the opposite side of the machine.

In carrying out the invention, I employ a chain comprising the usual circumferential side chains 1, the latter, according to my ideas, being split or separated at points opposite one another and these disconnected ends being connected together by suitable retainers or fasteners 2. As before indicated the chain embodies a plurality of spaced substantially independent tread sections, these sections, by preference being made up of central longitudinally elongated plates 3 and a plurality of transverse chains 4 and 5. A careful examination of the particular arrangement of transverse chains will disclose the fact that the chains 4, which are arranged in divergent relation with respect to one another, are connected to the corners of the plates while the chains 5 are arranged between the divergent chains and are connected to the central portions of the plates 3, all of said transverse chains being connected at their outer ends to the side chains 1. These elements make up what is to be known as a tread section. In order to retain the tread sections in proper spaced relation and the individual chains thereof in proper spaced relation, I make use of a plurality of short longitudinal chains 6, and these I dispose in alinement with the plates 3 and connect them at their opposite ends to the ends of the latter. This construction and arrangement of parts forms a very effective means for gaining the desired and proper traction and eliminates, as much as is possible, side skidding and also skidding in other directions. This result is insured since my construction and arrangement embodies quite a number of chains and these chains are so close to one another that very little of the tire casing contacts the ground. At this point, I wish to direct attention to the fact that the plates 3 are equipped on their outer faces with oblique ribs 7. I further wish to state at this point that in actual use, the chains will be sold in pairs, that is, a chain of the type disclosed in Fig. 1 will be accompanied by a chain of the type disclosed in Fig. 7, it being understood, when using these chains, that one goes on the wheel on one side of the machine while the remaining one goes on the corresponding wheel on the opposite side of the machine. It has been previously pointed out that the ribs of the plate on one of the chains are disposed in divergent relation with respect to the ribs on the plates of the other chain and this particular arrangement of ribs prevents, as much as possible, side skidding of the machine. In the particular showing of the chains, it may be said that the one shown in Fig. 1 is adapted for use on a left-hand wheel, while the one shown in Fig. 7 is adapted for use on a right-hand corresponding wheel. When thus used the ribs will incline toward each other and toward the inner sides of the wheels and the same results will be accomplished that are obtained with tractor wheels embodying a similar arrangement.

It has been before intimated that the tread chains, including the spacing chains 6, opposite the fasteners 2, have their ends disconnected as shown in Fig. 2. It therefore becomes necessary to provide a fastener for securing these ends together. In view of this, I provide a novel fastener for accomplishing this end. While the fastener could be of some other construction, I prefer to employ one embodying a pair of comparatively short strips or bars 8, said bars being pivotally connected intermediate their ends as indicated at 9. A careful consideration of the exact construction of this fastener will disclose the fact that only the intermediate portions of the bars are in direct contact with one another and that the end portions thereof are directed laterally in opposite directions as indicated at 10, directed laterally and parallel with respect to the intermediate portions as indicated at 11, and then at right angles and toward each other as indicated at 12, the last named portions of the respective bars being arranged in overlapping relationship as shown, and passing through the adjacent end links of the divergent tread chains 4 and spacing chains 6. Thus, the fastener serves to connect these chains together and the links of the latter serve to prevent pivotal movement of the bars 8 and serve to retain the overlapped ends of the latter in operative relation. If desired, the extremities of the opposite ends of the bars may be bent laterally toward each other to provide hooks 14 which serve to prevent accidental disconnection of the chain links from the fastener. Furthermore, if desired, the laterally bent ends 12 of the bars may be formed with seats for reception of the end links of the spacing chains 6, to retain these chains in their proper position with respect to the adjacent chains.

The construction and arrangement of chain and elements which it includes is thought to be described sufficiently in detail to enable persons skilled in the art to which the invention relates, to obtain a clear understanding of the same. Therefore, a more lengthy and detailed description is deemed unnecessary. It is also thought unnecessary to describe the manner of applying and removing the chains and connecting the improved fastener with the ends of the tread chains.

Since probably the best results may be obtained with the construction and arrangement herein shown and described, this construction and arrangement is taken as the preferred embodiment of the invention. However, I wish it to be understood that various minor changes within the shape, size, and arrangement of parts, may be resorted to without departing from the spirit of the invention or the scope of the subjoined claim.

I claim:

A tire chain comprising a pair of circumferential side chains, a plurality of circumferentially spaced substantially rectangular plates provided on the outer faces with anti-skid ribs, transverse relatively short divergent tread chains connected with the opposite longitudinal edges of said plates and with links of said side chains, and central tread chains arranged between the divergent chains, these chains being connected with the approximate centers of said plates and also connected with said side chains, and other tread chains alined with and connecting and spacing said plates with one another.

In testimony whereof I have hereunto set my hand.

CHARLES S. HAMILTON